March 7, 1972 H. N. ANDREWS ET AL 3,647,622
FUEL ELEMENT FOR A NUCLEAR REACTOR
Filed Aug. 13, 1968

INVENTORS
Harry N. Andrews, John F. Patterson
and John F. Wilson
BY
ATTORNEY

United States Patent Office 3,647,622
Patented Mar. 7, 1972

3,647,622
FUEL ELEMENT FOR A NUCLEAR REACTOR
Harry N. Andrews, Export, and John F. Patterson and John F. Wilson, Murrysville, Pa., assignors to Westinghouse Electric Corporation, Pittsburgh, Pa.
Filed Aug. 13, 1968, Ser. No. 752,299
Int. Cl. G21c 3/04
U.S. Cl. 176—68
6 Claims

ABSTRACT OF THE DISCLOSURE

A metallic clad sealed fuel element for a nuclear reactor which may be initially pressurized to resist creep collapse in the early stages of burnup and which has one or more normally sealed plenum chambers which are automatically punctured when predetermined increased pressures are reached during burnup to provide void space for fission gases. In one example, the plenum chambers each comprise an elongated bellows-like structure which when compressed by the increasing pressures within the fuel element cause a wall thereof to be punctured by an internally mounted pin.

CROSS-REFERENCE TO RELATED APPLICATIONS

This invention is related to and is an improvement over a copending application Ser. No. 738,237, (W. E. 39,392), filed June 19, 1968 by Harry M. Ferrari, and assigned to the present assignee.

BACKGROUND OF THE INVENTION

This invention relates to a clad fuel element for nuclear reactors, and more particularly to fuel elements which are subject to internal pressure buildup within the cladding during operation.

In order to minimize the pressure difference across the cladding of fuel elements it has been found desirable in certain instances to utilize internal pressurization. Fuel elements are used in nuclear reactors which have a relatively high internal pressure, e.g., 2250 p.s.i. in present pressurized water reactors. This results in high stress levels in the cladding unless the external pressure is balanced by internal pressurization.

Internal pressurization increases the necessity of providing suitable means for assuring that the internal pressure which is increased by the generation of fission gases during operation does not exceed the external pressure. Even where initial internal pressurization is not used, higher burn-up ratings now used to achieve higher efficiencies in utilization of fissionable materials cause relatively high internal pressure to be achieved during the operational cycle. The usual solution is to leave a void space for the collection of fission gases. A more recent solution disclosed in the aforementioned copending application utilizes a normally sealed low pressure chamber which ruptures at a predetermined pressure to collect fission gases. The latter solution has the advantage of decreasing the volume necessary to assure that an overpressure condition does not arise. However, a rupturable chamber has the disadvantage of being difficult to manufacture so as to assure access to fission gases at a predetermined pressure. Even small differences in the thickness of a rupture disc can greatly vary the pressure at which it ruptures.

To be acceptable, a normally sealed fission gas chamber must rupture when the predetermined pressure is reached. A premature rupture could cause stresses due to external compression of the cladding above design limitations. On the other hand, a delayed rupture could result in particularly serious stress reversal, i.e., the cladding could be put in tension due to the internal pressure exceeding the external pressure.

Multiple rupture chambers can be used to achieve improved stress levels where the rupture pressures of the various chambers can be predicted with assurance. The pressures at which each of a plurality of fission gas chambers becomes accessible to gas can be set at different levels so as to narrow the range of differential pressures to which the cladding is subject. However, this task becomes very difficult where the pressure at rupture of each chamber cannot be accurately predicted within a relatively narrow range as would be the case where only rupture discs or frangible sections are utilized.

SUMMARY OF THE INVENTION

Accurately predictable rupture pressures are obtained by providing within the sealed cladding an elongated bellows-like member which when compressed by increasing external pressures thereon, causes a side thereof to be ruptured, or more specifically punctured, by an internally mounted spear-like member.

By way of example, the spear-like puncturing device may have its sharp end displaced slightly from one end of the bellows with its base fixed supported by an end plug at the other end of the bellows. An increasing pressure will thus first cause the bellows to compress relieving some pressure and then a wall to be punctured allowing fission gases to enter the interior of the bellows.

The distance between the sharp end of the internally mounted pin and the movable end of the bellows may be varied to allow for differences in the puncture pressures.

DESCRIPTION OF THE DRAWINGS

For a better understanding of the invention, reference may be had to the accompanying drawings, in which.

PREFERRED EMBODIMENTS OF THE INVENTION

Figure 1:
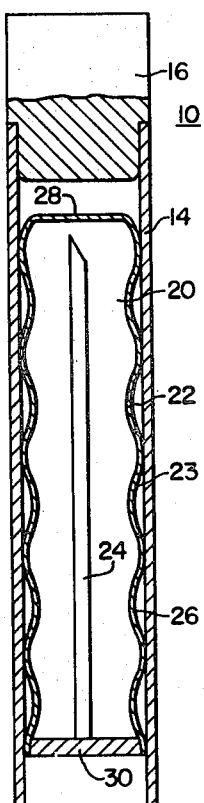
FIG. 1 shows a partial sectional view of a nuclear fuel element in accordance with this invention.

A fuel element 10 in accordance with this invention is shown in FIG. 1. Fuel element 10 comprises pellets 12 of a suitable nuclear fuel, for example uranium dioxide hermetically clad in a metallic sheath 14 formed from a corrosion resistant material, such as stainless steel or a zirconium alloy. The ends of the sheath 14 are hermetically sealed by welding end plugs 16 and 18 thereto, or by other suitable means.

The fuel element 10 may be pressurized during the manufacturing process. This makes for a more efficient design, but the puncturable chamber, to be described, is desirable even in the absence of initial internal pressurization. As mentioned, internal pressurization reduces the level of stresses resulting from compression of the fuel element 10. Suitable means and methods for pressurization are fully disclosed in a copending application 850,198 filed Aug. 14, 1969 by Ferrari and assigned to the present assignee.

One or more hollow members 22 enclosing normally sealed unpressurized chambers 20 are supported internally of the fuel element 10. The chambers 20 are designed to accommodate fission gases given off during the burnup of the nuclear fuel pellets 12. It is accordingly required that chambers 20 become accessible at predetermined pressures to generate within cladding 14 the fission gases. The range of pressures to which the sheath 14 is subject may be narrowed where the accessibility pressures are predictable. In accordance with this invention, and in order to more accurately predict the rupture pressure of chamber 20, the chamber is formed by and enclosed within a hollow bellows-like member 22 having a generally tubular side wall 23. A spear-like member 24 is mounted internally of the hollow member 22 and is displaced in small distance from a wall thereof. Upon compression of the member 22 due to increasing pressure external to it but internal of cladding 14 caused by fission gases given off during the burnup of the nuclear pellets 12, a wall of the hollow member 22 is compressed until the wall located adjacent to the tip of member 24 is punctured by the spear-like member 24, see FIG. 2. The design fission gas pressure which causes the puncturing of hollow member 22 is preferably higher than the internal pressure at the beginning of life, where initial internal pressure is used, and lower than the external pressure on cladding 14.

Fuel elements designed to operate in present pressurized water reactors are subject to external pressures of between 2000 p.s.i. and 2250 p.s.i. during operation. A representative temperature at the center of each pellet 12 is approximately 4200° F. with a surface temperature of approximately 1100° F. The cladding is at a representative average temperature of between 650° F. and 850° F. during operation in a reactor core.

Nuclear reactors are subject to periodically changing power demands. These demands are generally cyclic over 24 hour periods. The pellets 12 and the cladding 14 are subject to a wide range of cyclic temperature and pressure distributions which are primarily reflected in a rather severe fatigue strain problem in the sheath or cladding 14.

Moreover during the life of a suitable nuclear fuel, such as uranium dioxide, fission gases such as xenon and krypton are released which cause substantial increases in the internal pressure of the fuel element 10. In the past a relatively large void space was provided to accommodate the fission gases. The problem of accommodating fission gases is, of course, even more severe where internal pressurization is utilized at the beginning of life.

Figure 2:
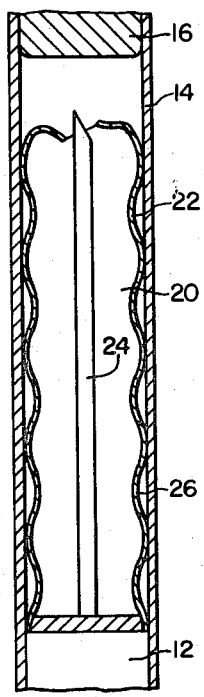
FIG. 2 shows a sectional view of the fuel element of FIG. 1 after fission gas buildup has rendered a chamber accessible.

FIGS. 1 and 2 show an exemplary embodiment of a fuel leement which is suitable for the severe environment of a nuclear reactor and which also minimizes the stress levels to which the cladding or sheath 14 is subject without requiring prohibitively long regions to accommodate fission gases. The embodiment of FIGS. 1 and 2 desirably includes a sheath 14 constructed of a metal which is substantially inert to the environment existing within nuclear reactors. In this example, the sheath 14 has an outside diameter of 0.444 inch. The pellets 12, which may be uranium dioxide, have a preferred diameter of 0.400 inch. The thickness of the cladding in view of the reduced stress levels to which it is subject need only be 0.019 inch, assuming 304 stainless steel is used, as opposed to 0.028 inch which would have been required in the fuel elements of the prior art, i.e., elements without internal pressurization. The reduction in cladding thickness of 0.009 inch is calculated on the basis of an initial internal pressurization at reactor operating temperatures of up to 1500 p.s.i. at the beginning of life. Since the pressure of fuel element 10 increases about 3 fold when inserted in a nuclear reactor this implies an internal pressurization at room temperature of only up to 500 p.s.i. need be obtained during manufacture.

The length of the fuel element 10 is primarily determined by the requirements of the reactor in which it is to be used and the amount of void space necessary for a chamber or chambers 20 to collect the fission gases yielded during burnup. If fuel elements 10 of the prior art had one hundred and forty-four inches of pellets 12 therein, six inches of additional length would be necessary in presently manufactured fuel elements. In accordance with this invention wherein one or more puncturable bellows 22 are utilized to provide void spaces which are at a very low pressure when punctured, only three inches of additional length would be required, thus, employing the invention the overall length of each fuel element is reduced three inches in this example.

The member 22 may be formed from an approximately 0.010 inch thick stainless steel tube. The convolutions of reduced sections 26 of the member 22 can be produced through roll down on a mandril, hydropressure devices well known in the art, or any other suitable means. The end discs 28 and 30 are then welded or brazed to the tubular bellows. End disc 28 is relatively thin so as to be easily punctured and may be on the order of 0.004 inch. The other end disc 30 which has the pin 24 affixed therein must be relatively thick in order to keep the pin 24 properly aligned. This may be assured by utilizing a 0.25 inch thick disc 30 and fitting the pin 24 through a hole provided in disc 24 for this purpose, and welding or brazing.

The member 22 is inserted in the sheath 14 just before the plug 16 is welded thereto. Member 22 need not be welded to an interior wall of the sheath.

Figure 8:
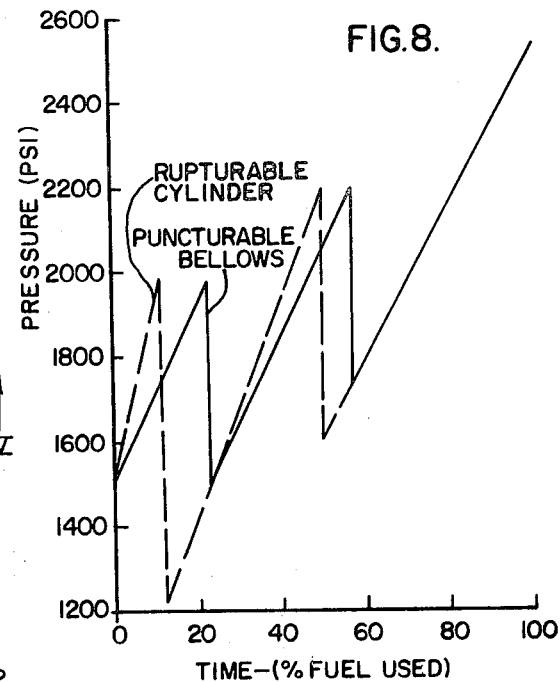
FIG. 8 is a graphical comparison of the means of this invention of that of the prior art for providing additional void space for fission gas accumulation.

As previously indicated, the arrangement of this invention is of particular advantage where multiple fission gas collection chambers 20 are utilized. The graph of FIG. 8 compares the pressure variations within a fuel element 10 wherein two rupturable cylinders are used with an element 10 having two puncturable hollow members. As may be seen, both elements 10 are assumed to have the same pressure, 1500 p.s.i., when first brought to operating temperatures within the reactor. The internal pressure of the rupturable chamber rises more quickly than that of the bellows members since a bellows member initially provides additional void space through contraction. In this example, one of each type fission gas collection chambers is assumed to be rendered accessible at 2000 p.s.i. The rupturable cylinder is seen to cause the internal pressure to drop below its initial (at temperature) pressure. This causes a differential pressure which results in a stress level higher than the initial level. In contrast, the bellows member of this example, when punctured, recreates, in this example, substantially the initial differential pressure. As the interiors of succeeding bellow members 22 are rendered accessible to fission gases, the resulting differences in the resulting differential pressure are less severe. However, it should be noted that the beliow members 22, causes smaller drops in pressure. Moreover, since the rupture pressures of the cylinders cannot be as accurately predicted, the sheath 14 must be made of a thicker structure to assure, for example, that a premature rupture does not result in stress levels higher than the design level.

Other suitable bellows structures are exemplified in FIGS. 3-7; wherein the same reference numerals are used to identify similar structures.

Figure 3:
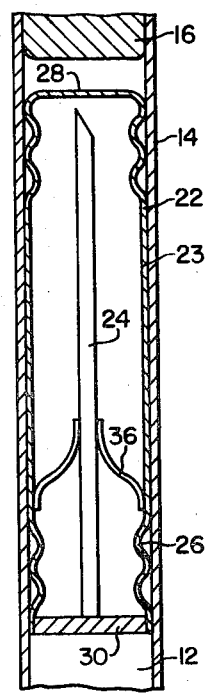
FIG. 3 shows a modified form of the fuel element of FIG. 1.

In FIG. 3, bellows member 22 is made from a tube 23 which has convolutions 26 only at its ends. A guide 36 is affixed to a central portion of the bellows member 22 to hold the pin 24 in proper alignment. More fission gas may be retained within the interior of such bellows-like members since less interior space is occupied by convolutions.

Figure 5:
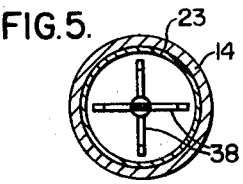
FIG. 5 is a sectional view of FIG. 4 taken along line V—V.
Figure 4:
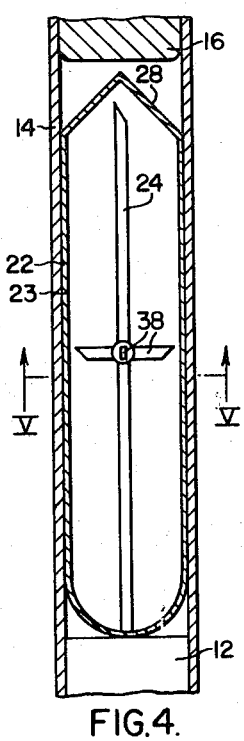
FIG. 4 shows a different embodiment of a fuel element in accordance with this invention.

In FIGS. 4 and 5 embodiment, the convolutions are omitted from the tubular side wall 23. The spear-like member 24 has spears 38 mounted on it, and oriented perpendicular thereto. Moreover, end disc 28 is conically shaped so as to collapse onto the spear-like member 24.

Here, there are two modes of failure. Either the conical end disc 28 may be punctured by the spear-like member 24, or the side wall 23 may be punctured by spears 38.

Figure 6:
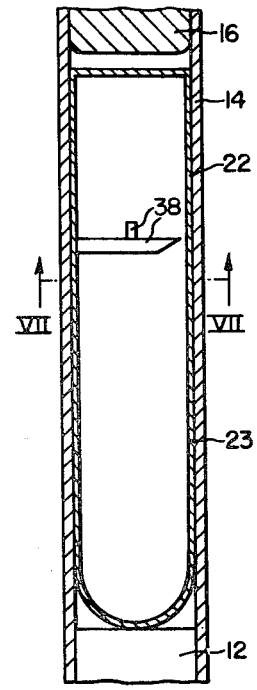
FIG. 6 shows still another fuel element in accordance with this invention.
Figure 7:
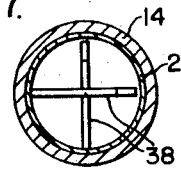
FIG. 7 is a sectional view of FIG. 6 taken along line VII—VII.

The embodiment of FIGS. 6 and 7 is similar to that of FIGS. 4 and 5 except that in the embodiment of FIGS. 6 and 7 the spear-like member 24 and the conically shaped end disc 28 are omitted. Instead, spears 38 are affixed to the sidewall 23 of the bellows-like structure 22. The spears 38 are oriented to puncture the side wall 23 as pressure due to fission gas buildup compresses the side wall 23.

While there have been shown and described what are at present the preferred embodiments of the invention, modifications thereto will readily occur to those skilled in the art. In particular, multiple chambers, each designed to be punctured at a predetermined pressure, may yield a superior stress pattern particularly under conditions of cycling. These chambers may be formed with a centrally located common end plug or disc. It is not desired, therefore, that the invention be limited to the specific arrangements shown and described and it is intended to cover in the appended claims all such modifications as fall within the scope of the invention.

Therefore, we claim:

1. A fuel element for nuclear reactors which comprises:
   a sealed generally tubular sheath containing nuclear fuel, said sealed sheath being internally pressurized initially with a gaseous atmosphere at a selected pressure above 100 p.s.i.
   a seal chamber totally contained within the sheath said chamber being isolated from the internal pressure within the sheath prior to rupture of said chamber the interior of said chamber being at a lower pressure than that to which the sheath is pre-pressurized; and
   means for puncturing said sealed chamber disposed within the tubular sheath and associated with said chamber so as to puncture same when a predetermined pressure is built up within said tubular sheath due to fission gas accumulation whereby the fission gas may enter said otherwise sealed chamber and the fission gas pressure is at least partially relieved and the fission gas remains contained within said fuel element.

2. The fuel element of claim 1 wherein said means for puncturing the chamber comprises a spear-like member.

3. The fuel element of claim 2 wherein the spear-like member is mounted within said chamber.

4. The fuel element of claim 3 wherein the chamber comprises a bellows-like structure having at least one movable wall, said wall moving inwardly in response to an increased fission gas pressure onto the point of said spear-like member whereby the wall is punctured.

5. The fuel element of claim 4 wherein the bellows-like member comprises a substantially tubular member and two end walls, said tubular member having convolutions formed therein whereby it is rendered longitudinally flexible, one end wall being relatively thin so as to be easily punctured, and the other end wall being relatively thick and having said spear-like member mounted thereon.

6. The fuel element of claim 4 wherein the bellows-like member comprises a substantially tubular member and two end walls, said spear-like member being mounted on the tubular member to puncture same.

References Cited

UNITED STATES PATENTS

| | | | |
|---|---|---|---|
| 3,235,466 | 2/1966 | Williams et al. | 176—80 X |
| 3,291,698 | 12/1966 | Fortescue | 176—72 X |
| 3,399,112 | 8/1968 | Dodd | 176—37 X |
| 3,350,271 | 10/1967 | Maidment et al. | 176—80 X |
| 3,406,094 | 10/1968 | Beisswenger et al. | 176—68 X |
| 3,460,236 | 8/1969 | Shoudy Jr. | 176—68 X |
| 3,459,636 | 8/1969 | Germer | 176—68 |

BENJAMIN R. PADGETT, Primary Examiner

G. G. SOLYST, Assistant Examiner

U.S. Cl. X.R.

176—79